(12) United States Patent
Kim

(10) Patent No.: US 10,202,021 B2
(45) Date of Patent: Feb. 12, 2019

(54) VEHICLE COMPRESSOR CONTROL APPARATUS AND CONTROL METHOD

(71) Applicant: HYUNDAI MOTOR COMPANY, Seoul (KR)

(72) Inventor: Yeong Jun Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 192 days.

(21) Appl. No.: 15/362,336

(22) Filed: Nov. 28, 2016

(65) Prior Publication Data

US 2018/0001743 A1 Jan. 4, 2018

(30) Foreign Application Priority Data

Jul. 4, 2016 (KR) .................. 10-2016-0084389

(51) Int. Cl.
*B60H 1/32* (2006.01)
*B60T 13/52* (2006.01)
*B60T 17/02* (2006.01)

(52) U.S. Cl.
CPC ......... *B60H 1/3216* (2013.01); *B60H 1/3208* (2013.01); *B60T 17/02* (2013.01);
(Continued)

(58) Field of Classification Search
CPC ....... B60T 13/52; B60T 17/02; B60H 1/3216; B60H 2201/3272; B60H 2201/3273
See application file for complete search history.

(56) References Cited

U.S. PATENT DOCUMENTS

| 2003/0196442 A1* | 10/2003 | Wakisaka | B60H 1/3208 62/133 |
| 2006/0162352 A1* | 7/2006 | Roehm | B60H 1/3208 62/133 |

(Continued)

FOREIGN PATENT DOCUMENTS

| JP | 2002-248934 A | 9/2002 |
| JP | 2003-312242 A | 11/2003 |

(Continued)

*Primary Examiner* — Khoi H Tran
*Assistant Examiner* — Robert T Nguyen
(74) *Attorney, Agent, or Firm* — McDonnell Boehnen Hulbert & Berghoff LLP

(57) ABSTRACT

The disclosure herein relates to a vehicle compressor control apparatus and control method, and more particularly to a vehicle compressor control apparatus for controlling compressor operating rate to allow braking according to brake negative pressure, while maintaining a minimum level of operation of the compressor. By preventing compressor deactivation during braking, the control apparatus assists in preventing moisture build-up of moisture on a windshield that decreases visibility for a driver and increases safety concerns. The apparatus includes: a compressor that reduces a temperature by compressing an air conditioner coolant; a data sensor that detects status data; and a controller that determines whether a brake negative pressure margin rate meets a first reference value when the status data satisfy a predetermined condition, and sets a compressor operating accordingly when the brake negative pressure margin rate meets a first reference value.

13 Claims, 3 Drawing Sheets

(52) U.S. Cl.
CPC .............. *B60H 2001/3272* (2013.01); *B60H 2001/3273* (2013.01); *B60T 13/52* (2013.01)

(56) References Cited

U.S. PATENT DOCUMENTS

2013/0239599 A1* 9/2013 Pursifull ............ B60H 1/00764
62/115
2014/0007573 A1* 1/2014 Shimada ............... B60T 13/662
60/545

FOREIGN PATENT DOCUMENTS

| JP | 2004-196171 A | 7/2004 |
| JP | 2005-264874 A | 9/2005 |
| KR | 10-2007-0028938 A | 3/2007 |

* cited by examiner

VEHICLE COMPRESSOR CONTROL APPARATUS AND CONTROL METHOD

CROSS-REFERENCE TO RELATED APPLICATION

This application claims priority to and the benefit of Korean Patent Application No. 10-2016-0084389 filed in the Korean Intellectual Property Office on Jul. 4, 2016, the entire contents of which are incorporated herein by reference.

BACKGROUND (a) Field of the Invention

The disclosure herein relates to a vehicle compressor control apparatus and a control method therefor, and more particularly to a vehicle compressor control apparatus for controlling a compressor operating rate based on a brake negative pressure margin rate. In addition, the disclosure provides methods for preventing the compressor from shutting down, which assists in preventing build-up of moisture on a wind shield.

(b) Description of the Related Art

In general, a vehicle may contain various devices for the convenience of the passengers. Example devices include an air conditioner for maintaining a comfortable internal temperature by suitably cooling the inside of the vehicle.

Traditional vehicle air conditioners use a coolant which is compressed and circulated through the rotating force of an engine. The air conditioner includes an evaporator, a compressor, a condenser, an expansion valve, and the like.

Gaseous coolant evaporated from the evaporator is introduced into the compressor and compressed, and the compressed, high temperature, high pressure gaseous coolant is sent to the condenser. The forcibly cooled coolant from the condenser passes through the expansion valve and expands to a wet steam state with low temperature and low pressure, and is then sent to the evaporator where the cooled coolant is gasified, and enters a low temperature, low pressure gaseous state.

Heat is transferred from air passing through the air conditioner to the coolant, thereby cooling the air flow. The cooled air is introduced into the inside of the vehicle to modulate the internal temperature of the vehicle.

The compressor compresses low pressure coolant gas into high pressure coolant gas which is then sent to the evaporator.

In a conventional vehicle air conditioner, if brake negative pressure is less than or equal to a predetermined negative pressure, the air conditioner compressor is deactivated in order to ensure brake performance. When the compressor is deactivated, under certain conditions, moisture may build up on the windshield, reducing visibility for the driver and increasing safety concerns.

In particular, because atmospheric pressure at higher elevations is lower than that in lower elevations, operating a vehicle at high elevations is disadvantageous when brake negative pressure reaches a level that causes the compressor to deactivate. Because the amount of time the compressor is deactivated increases as elevation increases, there is a corresponding increased risk of moisture build up and diminished visibility when at higher elevations.

SUMMARY OF THE INVENTION

The present invention provides a vehicle compressor control apparatus and a method for controlling a vehicle compressor by adjusting the compressor operating rate depending on brake negative pressure margin rate.

An example embodiment provides a vehicle compressor control apparatus and a method for controlling a vehicle compressor capable of reducing the compressor operating rate rather than deactivating the compressor when predetermined conditions are met.

A further example embodiment provides a vehicle compressor control apparatus including: a compressor that compresses an air conditioner coolant and reduces the coolant temperature; a data sensor that receives status data used to control the compressor; and a controller that compares the status data to reference data and adjusts the compressor operating rate accordingly.

In an example embodiment, the controller determines whether a brake negative pressure margin rate is less than or equal to a first reference value when the status data satisfy a predetermined condition. If the brake negative pressure margin rate is less than or equal to a first reference value, the controller then sets a compressor operating rate based on the determined brake negative pressure margin rate.

The controller may use additional status data, including the external temperature for the vehicle; the vehicle speed; the altitude of the vehicle, and the operating rate of the alternator, among others.

In an example embodiment, the controller determines whether the external temperature is within a preset range. If the external temperature is within the preset range, the controller then determines whether a vehicle speed is less than or equal to a reference speed. If the vehicle speed is less than or equal to a reference speed, the controller then determines whether the vehicle's altitude above sea level is equal to or greater than a reference altitude. If the altitude in greater than the reference altitude, the controller then determines if the vehicle speed is less than or equal to the reference speed. If the vehicle speed is less than or equal to a reference speed, the controller then determines whether an alternator operating rate is equal to or greater than a preset value. If all of these conditions are met, the controller determines a compressor operating rate based on a measured negative brake pressure margin rate.

In a further example embodiment, the controller may use a control map to set the compressor operating rate given a specific margin rate of brake negative pressure. The control map correlates a plurality of compressor operating rates to a plurality of negative pressure margin rates.

In additional example embodiments, the controller may set the compressor operating rate to a minimum operating rate when the brake negative pressure margin rate is less than or equal to a second reference value.

The controller also may set the compressor operating rate to a preset default operating rate when the status data do not meet any specific predetermined conditions.

In addition to sensing brake pressure, the data sensor may also include at least one of: an external temperature sensor; a vehicle speed sensor; and an atmospheric pressure sensor.

The vehicle compressor control apparatus may further include an intake manifold air pressure sensor. The controller may use the intake air pressure data and atmospheric pressure data to determine brake negative pressure margin rate.

Another example embodiment provides a method of controlling a vehicle compressor, including the steps of: detecting status data when an air conditioner is operating; determining whether the status data meet a predetermined reference condition; confirming a brake negative pressure margin rate based on the brake negative pressure when the status data meet the predetermined condition; determining whether the brake negative pressure margin rate is less than or equal to a first reference value; setting a compressor operating rate based on a brake negative pressure margin when the brake negative pressure margin rate is less than or equal to the first reference value; and adjusting the compressor operating rate.

A further example embodiment includes a non-zero minimum compressor operating rate (i.e the compressor does not deactivate) in order to avoid build-up of moisture on a windshield.

Further, because the compressor operating rate is reduced but the compressor is not deactivated, even in a worst-case scenario, there is no need for the vehicle to have a brake negative pressure amplifier, and both material costs and vehicle weight are reduced.

Other various effects may be directly or indirectly disclosed in the following description of the various example embodiments.

DETAILED DESCRIPTION OF THE EMBODIMENTS

An example embodiment of a control apparatus and method for controlling a vehicle compressor are described herein with reference to the accompanying drawings. The following drawings and a detailed description relate to various example embodiments to efficiently describe characteristics of the present invention. However, the present invention is not limited to the following drawings and description. Detailed descriptions of well-known functions and structures incorporated herein may be omitted to avoid obscuring the subject matter of the present disclosure.

Figure 1:
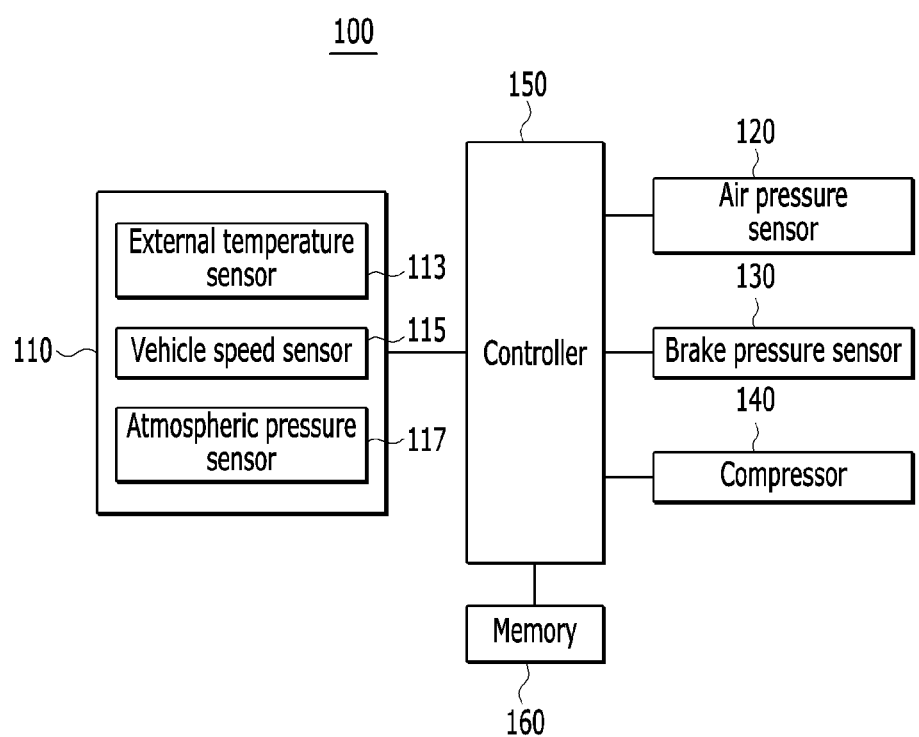
FIG. 1 is a block diagram schematically illustrating configuration of a vehicle compressor control apparatus according to an example embodiment.

FIG. 1 is a block diagram schematically illustrating a configuration of a vehicle compressor control apparatus according to an example embodiment.

Referring to FIG. 1, an example embodiment of a vehicle compressor control apparatus 100 includes a data sensor 110, an air pressure sensor 120, a brake pressure sensor 130, a compressor 140, a controller 150, and a memory 160.

Data sensor 110 detects status data necessary to control compressor 140. Data sensor 110 may periodically detect the status data, or may detect the status data at intervals determined by and based on instructions provided by controller 150.

In a further example embodiment, data sensor 110 includes an external temperature sensor 113, a vehicle speed sensor 115, and an atmospheric pressure sensor 117.

The external temperature sensor 113 measures an external temperature of the vehicle. The external temperature sensor 113 provides external temperature data to controller 150.

The vehicle speed sensor 115 measures a vehicle speed and provides speed data to controller 150.

The atmospheric pressure sensor 117 measures the atmospheric pressure at the location of the vehicle and provides the atmospheric pressure data to controller 150.

Air pressure sensor 120 measures intake manifold air pressure and provides air pressure data to controller 150. Air pressure sensor 120 may measure air pressure periodically or at intervals determined by and based on instructions provided by controller 150.

Brake pressure sensor 130 may detect brake negative pressure based on the engine air intake negative pressure. Brake pressure sensor 130 provides brake pressure data to controller 150. Brake pressure sensor 130 may measure the detected brake negative pressure periodically or at intervals determined by and based on instructions provided by controller 150.

Compressor 140 compresses air conditioner coolant to high temperature and high pressure to operate the air conditioner. Compressor 140 may be run at a compressor operating rate determined by controller 150.

Controller 150 controls data sensor 110, air pressure sensor 120, brake pressure sensor 130, compressor 140, and memory 160, all of which are constituent elements of an example embodiment of the vehicle compressor control apparatus.

In detail, controller 150 receives status data from data sensor 110. The status data is used to control the compressor 140 operating rate, and may include at least one of an external temperature, vehicle speed, and air pressure.

If the status data satisfy a predetermined condition, controller 150 determines whether a brake negative pressure margin rate is less than or equal to a first reference value. The first reference value, which may be a preset value, is the value beginning at which controller 150 will adjust compressor operating rate without stopping operation of compressor 140.

If a brake negative pressure margin rate is less than or equal to the first reference value, controller 150 determines a compressor 140 operating rate based on the brake negative pressure margin rate of, and adjusts the compressor 140 operating rate.

In an example embodiment, controller 150 may include at least one processor operated according to a preset program. The preset program may include a series of commands for performing the respective steps of a method of controlling a vehicle compressor according to an example embodiment of the present invention. The method of controlling a vehicle compressor will be described in detail with reference to FIG. 2 and FIG. 3.

Memory 160 stores data generated by and for use by the constituent elements of the vehicle compressor control apparatus 100.

For example, memory 160 may store status data detected by data sensor 110. The memory may also store the data measured by air pressure sensor 120 and brake pressure sensor 130.

Memory 160 may further store a control map that matches compressor 140 operation rates with a plurality of detected negative brake pressure margin rates, and may further store a minimum compressor 140 operating rate.

Memory 160 may also store various programs to control overall operation of the vehicle compressor control apparatus 100.

Memory 160 may provide data requested by data sensor 110, compressor 140, or controller 150. In further example embodiments, memory 160 may include an integrated memory or a plurality of memories. For example, the memory 160 may include a Read-Only Memory (ROM), a Random Access Memory (RAM), and/or a flash memory.

Figure 2:
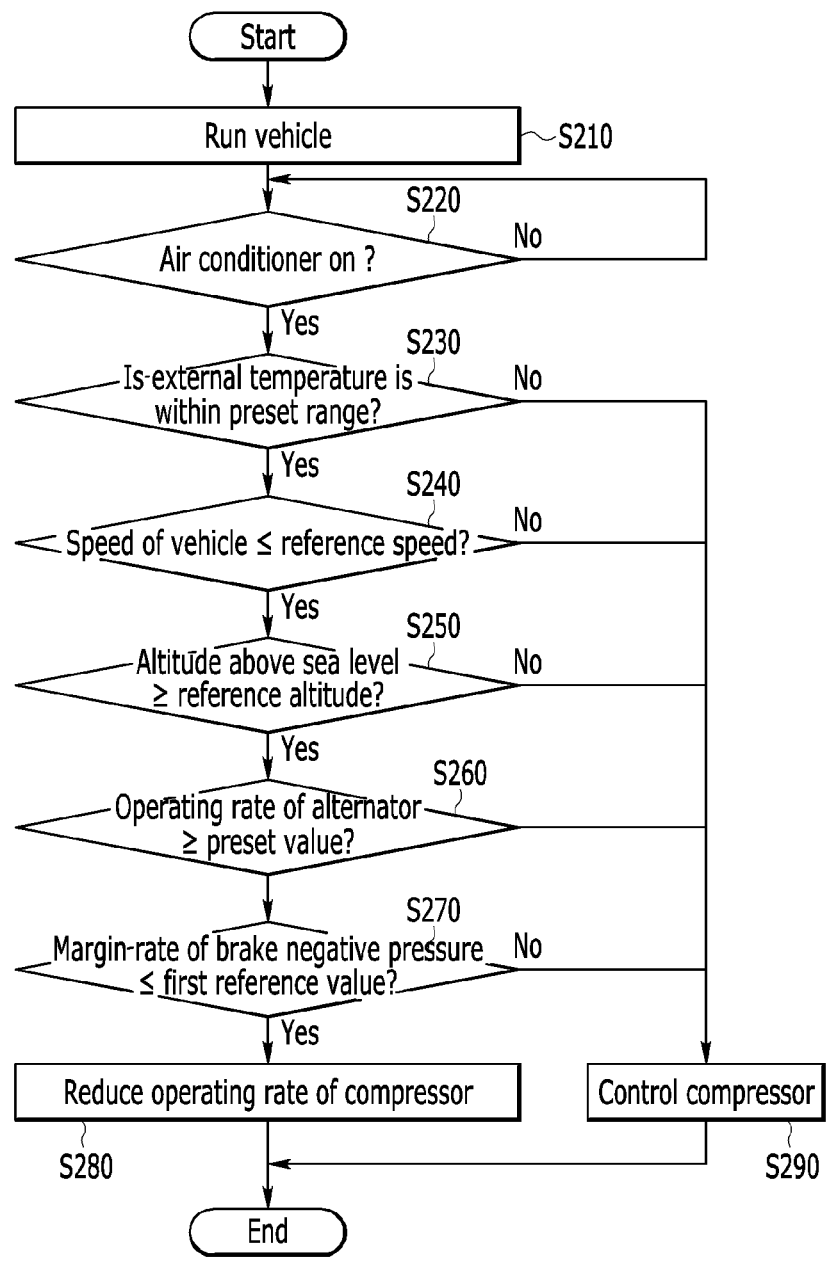
FIG. 2 is a flowchart illustrating a control method for a vehicle compressor according to an example embodiment.
Figure 3:
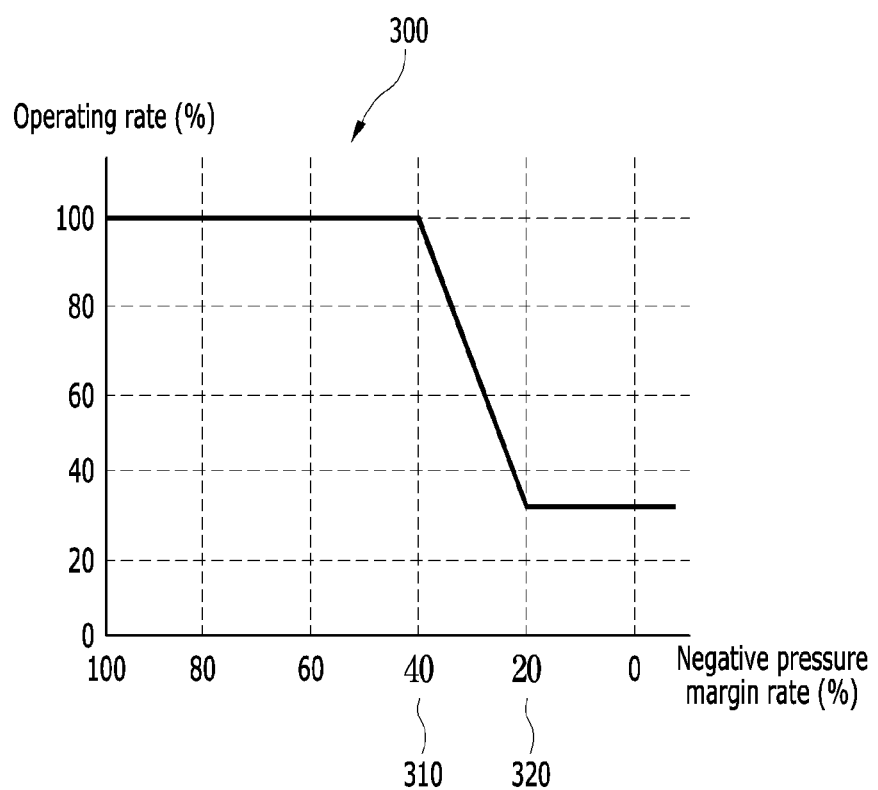
FIG. 3 is a diagram illustrating a control map according to an example embodiment.

A method of controlling a vehicle compressor according to an example embodiment is described below with reference to FIG. 2 and FIG. 3, FIG. 2 is a flowchart illustrating a control method for a vehicle compressor according to an example embodiment, and FIG. 3 is an diagram illustrating a control map according to an example embodiment.

Referring to FIG. 2, when a driver starts a vehicle, controller 150 runs the vehicle (S210). In this case, controller 150 may receive a vehicle start signal from an ignition sensor (not shown) to determine whether the vehicle is turned on. When the vehicle is started, controller 150 may drive the vehicle in accordance with driver requests.

Controller 150 determines whether an air conditioner is operating (S220). That is, controller 150 determines whether the air conditioner has been activated by an air conditioner switch or other control. In an example embodiment, controller 150 determines if the air conditioner has been activated by the driver turning on the air conditioner switch.

Meanwhile, if the air conditioner is turned off, controller 150 returns to step S220 to monitor whether the status of the air conditioner.

If the air conditioner is turned on, controller 150 determines whether an external temperature is within a preset range (S230). In other words, controller 150 receives an external temperature from an external temperature sensor 113 and determines whether the temperature is within a preset range. In an example embodiment, the preset range may include a first preset temperature and a second preset temperature representing the upper and lower bounds of a reference temperature range. Controller 150 determines whether the measured temperature is within the reference temperature range to confirm whether the external temperature satisfies a pre-determined condition. For example, if the first preset temperature is −3° C., and the second preset temperature is 23° C., controller 150 may determine whether the external temperature is in the range of −3° C. to 23° C.

If the external temperature is within a preset range, controller 150 may then determine whether the vehicle speed is less than or equal to a reference speed (S240). In other words, if the external temperature is within a preset range, controller 150 receives the vehicle speed from a vehicle speed sensor 115 to determine whether the vehicle speed is less than or equal to a reference speed. The reference speed may be a preset value representing a pre-determined condition. For example, if the reference speed is 15 kilometers per hour ("KPH"), controller 150 may determine whether the vehicle speed is less than or equal to 15 KPH.

If the vehicle speed is less than or equal to 15 KPH, controller 150 may then determine whether the vehicle's altitude above sea level is equal to or greater than a reference altitude (S250), that is, if the vehicle speed is less than or equal to a reference speed, controller 150 receives atmospheric pressure data from an atmospheric pressure sensor 117 (e.g. an altimeter) and uses it to calculate altitude above sea level. Controller 150 determines whether the calculated altitude above sea level is equal to or greater than a reference altitude. The reference altitude may be a preset value representing a predetermined condition. For example, if the reference altitude is 800 m, controller 150 may determine whether the altitude above sea level is equal to or greater than 800 m. Those of skill in the art will recognize that other sensors, e.g. GPS, may be used for determining altitude above sea level.

If the altitude above sea level is equal to or greater than the reference altitude, controller 150 then determines whether an alternator operating rate is equal to or greater than a preset value (S260). For example, the controller 150 may confirm the operating rate of the alternator based on a signal received from the alternator. Controller 150 determines whether the operating rate of the alternator is equal to or greater than a reference value. The reference value may a preset value representing a predetermined condition. For example, if the preset value is 70%, the controller 150 may determine whether the operating rate of the alternator is equal to or greater than 70%.

If the operating rate of the alternator is equal to or greater than the preset value, controller 150 determines whether a brake negative pressure margin rate is less than or equal to a first reference value (S270). In this case, controller 150 may use atmospheric pressure measured by the atmospheric pressure sensor 117 and intake manifold air pressure measured by the air pressure sensor 120, or may receive and confirm the brake negative pressure from brake pressure sensor 130.

In the example embodiment, when all of the conditions above are met (i.e. when the external temperature is within a preset range, the vehicle speed is less than or equal to the reference speed, the altitude above sea level is equal to or greater than the reference altitude, and the operating rate of the alternator is equal to or greater than the preset value), the vehicle compressor control apparatus 100 may prevent the compressor from deactivating due to brake negative pressure by reducing the compressor operating rate. Preventing the compressor from deactivating assists in preventing buildup of moisture on a windshield.

Controller 150 generates a brake negative pressure margin rate based on the brake negative pressure. Further, controller 150 determines whether the brake negative pressure margin rate is less than or equal to a first reference value. The first reference value may represent a reference value at which the controller will begin to adjust a compressor 140 operating rate. The first reference value may be set through a designated algorithm (e.g., program and probability model) or manually.

If the brake negative pressure margin rate is less than or equal to the first reference value, controller 150 reduces the compressor operating rate 140 to control the compressor 140 (S280). Specifically, controller 150 extracts an operating rate matching with a brake negative pressure margin rate from a control map to set the compressor operating rate. The control map may be a preset map configured by matching compressor 140 operating rates with a plurality of brake negative pressure margin rates. For example, as shown in FIG. 3, the control map is represented by reference numeral 300. As shown in FIG. 3, the first reference value for brake negative pressure margin rate may be 40%, as identified by item 310. This corresponds to a compressor 140 operating rate of 100%.

If the brake negative pressure margin rate is less than or equal to a second reference value, the controller 150 may set a minimum compressor 140 operating rate. For example, as shown in FIG. 3, the second reference value 320 may be 20%, corresponding to a compressor 140 operating rate of between 10% and 40%. The minimum operating rate may represent a non-zero operating for compressor 140, that is reducing the operating rate without turning off compressor 140.

If the status data do not satisfy the pre-determined conditions or the brake negative pressure margin rate exceeds a first reference value, controller 150 controls compressor 140 based on a preset default operating rate (S290). In other words, if the external temperature is not within the preset range, the vehicle speed exceeds the reference speed, the altitude above sea level is lower than a reference altitude, and/or the operating rate of the alternator is less than the preset value, controller 150 sets the compressor operating rate as a preset default rate. In addition, if the brake negative pressure margin rate exceeds the first reference value, controller 150 sets the compressor operating rate as a preset default rate. In an example embodiment, the preset rate may represent normal operating conditions for compressor 140, and may be 100%.

Controller 150 controls compressor 140 based on the compressor operating rate.

As described above, a vehicle compressor control apparatus 100 according to an example embodiment determines whether the vehicle is in a pre-determined state based on the external temperature, the vehicle speed, the altitude above sea level, and the operating rate of the alternator. If the vehicle is in the predetermined state, control apparatus 100 reduces compressor 140 operating rate so that the brakes may efficiently operate without deactivating the compressor 140, thereby resulting in potential buildup of moisture on the wind shield and decreased visibility for the driver.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling a vehicle compressor, comprising:
   detecting status data when an air conditioner is turned-on;
   determining whether the status data satisfy a predetermined condition;
   determining a brake negative pressure margin rate when the status data meets the predetermined condition;
   determining whether the brake negative pressure margin rate is less than or equal to a first reference value;
   setting a compressor operating rate when the brake negative pressure margin rate is less than or equal to the first reference value;
   after the determining whether the status data satisfy a predetermined condition, setting the compressor operating rate based on a preset default operating rate when the status data do not satisfy the predetermined condition; and
   controlling the compressor based on the compressor operating rate.

2. The method of controlling a vehicle compressor of claim 1, wherein:
   the step of determining whether the status data satisfy the predetermined condition comprises:
   determining whether an external temperature is within a preset range;
   when the external temperature is within the preset range, determining whether a vehicle speed is less than or equal to a reference speed;
   when the vehicle speed is less than or equal to the reference speed, determining whether an altitude above sea level is equal to or greater than a reference altitude; and
   when the altitude above sea level is equal to or greater than the reference altitude, determining whether an alternator operating rate is equal to or greater than a preset value.

3. The method of controlling a vehicle compressor of claim 1, further comprising:
   providing a control map that correlates a plurality of compressor operating rates with a plurality of brake negative pressure margin rates.

4. The method of controlling a vehicle compressor of claim 3, wherein:
   the step of setting a compressor operating rate when the brake negative pressure margin rate is less than or equal to the first reference value comprises:
   determining the compressor operating rate correlating to a measured brake negative pressure margin rate from the control map when the brake negative pressure margin rate is less than or equal to the first reference value; and
   using the determined compressor operating rate to set the compressor operating rate.

5. The method of controlling a vehicle compressor of claim 1, further comprising:
   after determining whether the brake negative pressure margin rate is less than or equal to the first reference value,
   setting the compressor operating rate based on a minimum operation rate when the brake negative pressure margin rate is less than or equal to a second reference value.

6. A vehicle compressor control apparatus comprising:
   a compressor;
   a data sensor; and
   a controller;
   wherein the controller receives status data from the data sensor; determines whether a brake negative pressure margin rate is less than or equal to a first reference value when the status data satisfy a predetermined condition; and sets a compressor operating rate corresponding to the brake negative pressure margin rate when the brake negative pressure margin rate is less than or equal to the first reference value, and
   wherein the controller sets the compressor operating rate to a preset default operating rate when the status data do not satisfy the predetermined condition.

7. The vehicle compressor control apparatus of claim 6, wherein the data sensor is a temperature sensor, a pressure sensor, an alternator operating rate sensor or a vehicle speed sensor.

8. The vehicle compressor control apparatus of claim 6, wherein the data sensor is an external temperature sensor; and
   wherein the control apparatus further comprises a vehicle speed sensor, an altitude sensor, and an alternator operating rate sensor; and
   wherein the controller determines whether the status data satisfy the predetermined condition by:
   determining whether an external temperature is within a preset range, determining whether a vehicle speed is less than or equal to a reference speed when the external temperature is within the preset range, determining whether an altitude above sea level is equal to or greater than a reference altitude when the vehicle speed is less than or equal to the reference speed, determining whether an operating rate of an alternator is equal to or greater than a preset value when the altitude above sea level is equal to or greater than the reference altitude, and determining whether the brake negative pressure margin rate is less than or equal to the first reference value when the operating rate of alternator is equal to or greater than the preset value.

9. The vehicle compressor control apparatus of claim 6, wherein: the controller sets the compressor operating rate using a control map when a measured brake negative pressure margin rate is less than or equal to the first reference value.

10. The vehicle compressor control apparatus of claim 9, wherein the control map correlates a plurality of compressor operating rates to a plurality of brake negative pressure margin rates.

11. The vehicle compressor control apparatus of claim 6, wherein: the controller sets the compressor operating rate to a minimum operating rate when the brake negative pressure margin rate is less than or equal to a second reference value.

12. The vehicle compressor control apparatus of claim 6, further comprising an intake manifold air pressure sensor,
 wherein the controller uses measured atmospheric pressure and measured intake manifold air pressure to generate the brake negative pressure margin rate.

13. The vehicle compressor control apparatus of claim 6, further comprising an engine intake pressure sensor,
 wherein the controller uses the measured engine intake pressure to generate the brake negative pressure margin rate.

* * * * *